United States Patent [19]

Schittko et al.

[11] Patent Number: 4,605,847
[45] Date of Patent: Aug. 12, 1986

[54] METHOD AND APPARATUS FOR THE CODED TAGGING OF ARTICLES, PARTICULARLY GARMENTS

[76] Inventors: Hermut Schittko, 9, Baumschulenstrasse, D-2072 Bargteheide; Peter Schultz, 2/145, Kieler Strasse, D-2085 Quickborn, both of Fed. Rep. of Germany

[21] Appl. No.: 495,608

[22] Filed: May 18, 1983

[51] Int. Cl.[4] .............................................. G06K 7/12
[52] U.S. Cl. .................................... 235/471; 235/454
[58] Field of Search ................ 235/454, 471; 209/589

[56] References Cited

U.S. PATENT DOCUMENTS

| 2,919,851 | 1/1960 | Otis | 235/61.9 |
| 3,337,718 | 8/1967 | Harper | 235/471 |
| 3,691,350 | 9/1972 | Kuhns | 235/471 |
| 3,875,419 | 4/1975 | Harms | 235/471 |
| 3,928,827 | 12/1975 | Kepka et al. | 250/579 |
| 4,136,778 | 1/1979 | Wortman et al. | 209/589 |

FOREIGN PATENT DOCUMENTS 2062917  5/1981  United Kingdom .

Primary Examiner—Harold I. Pitts
Attorney, Agent, or Firm—Young & Thompson

[57] ABSTRACT

A method for the coded tagging of articles, such as garments, comprises fitting to each of a plurality of articles a tagging element, such as a rigid plaque, bearing coded information in the form of portions of the element which permit the passage therethrough of a form of radiation, such as X-rays, which also passes through the material of the articles but to which the rest of the element is opaque. At least the portions of the articles bearing the tagging elements are conveyed in succession between an X-ray emitter and an X-ray detector, the detector producing output signals corresponding to the coded information on each tagging element, the output signals from the detector being supplied to a computer which processes the signals to store and process the coded information on the tagging element.

22 Claims, 7 Drawing Figures

METHOD AND APPARATUS FOR THE CODED TAGGING OF ARTICLES, PARTICULARLY GARMENTS

BACKGROUND OF THE INVENTION

The invention relates to a method and apparatus for the coded tagging of articles and particularly, but not exclusively, to the tagging of garments which may be subject to harsh treatment such as high temperatures, hard wear and/or action by chemicals.

SUMMARY OF THE INVENTION

The invention relates especially to the identification tagging of workwear which is supplied by linen hire companies to their customers' factories for the use of the employees, the hire company also undertaking regularly to wash or dry clean and to repair the rented garments and to replace them when worn out.

In such a scheme, garments returned to the linen hire company by one of its customers must be identified as being for the use of that particular customer, or even by a particular employee of that customer, so that the garment can be correctly routed after being cleaned and/or repaired by the hire company. Normally a relatively complicated procedure has had to be followd for this purpose, by which the used garments returned to the linen hire company are counted manually, possibly after preclassifying. In this way the number and type of garments returned by the customer concerned is established which represents the nominal data for later despatch. After processing, possibly after further classification, the garments must again be counted in order to ensure that the correct number can be returned to the customer. Only then can the washed or dry cleaned garments be packed and delivered to the customer. This double counting also facilitates internal control by the linen hire company.

The relatively high expenditure of time and effort involved in the double counting is nevertheless disadvantageous. In addition, accuracy in counting cannot be guaranteed and as a result losses and consequent complaints can arise.

It is apparent that control of the handling of garments might be improved by tagging each garment so as to identify the garment and provide any other relevant information in connection with it. However, conventional tagging methods are unsuitable for garments which are subject to harsh treatment of the kind referred to above since, in practice, conventional tags will in time become detached or unreadable as a result of the conditions to which the garment is subjected.

British Patent Specification No. 2,062,917A describes an improved method for the coded tagging of articles, particularly garments, in an endeavour to overcome the problems referred to above. In the arrangement described in the specification, garments are tagged by attaching to each garment a metal plaque bearing coded information in the form of perforations in the plaque. The plaque is attached to an outer surface of the garment and the coded perforations are read by a hand-held reading head. The reading head has a recess which fits over each plaque and probes which transmit signals to electronic recording and indicating apparatus according to whether or not a perforation is situated below a particular probe.

While the arrangement described in the earlier specification overcomes certain of the problems referred to, certain practical difficulties are found to arise in putting the method into effect. The main difficulties arise due to the operator having to fit the recess in the reading head accurately over the coded plaque and also to the probes only operating properly if less than a predetermined distance, of the order of a millimetre, from the surface of the plaque. Furthermore, disadvantages arise due to the necessity of attaching the plaque to an outer surface of the garment, since the plaque may thus more easily become detached from the garment.

Accordingly, there exists a requirement for a method and apparatus for coded tagging of garments and other articles where the coding plaques can be read automatically without the necessity of accurate positioning of a reading head by an operator and where the plaque may be concealed within the material of the garment. The present invention provides such an improved method and apparatus.

According to the invention a method for the coded tagging of articles, such as garments, comprises fitting to each of a plurality of articles a tagging element bearing coded information in the form of portions of the element which permit the passage therethrough of a form of radiation to which the rest of the element is opaque, passing at least the portions of the articles bearing the tagging elements in succession between an emitter and a detector of said form of radiation, and electronically processing signals from said detector to produce an output corresponding to the coded information on each tagging element.

Thus, in order to read the tagging element the article, such as a garment, merely requires to be positioned with the element approximately at right angles to the beam of radiation as the object is passed between the emitter and detector, and there is no necessity for contact of a reading head with the element and the element may thus be concealed within the material of the garment. Furthermore, the electronic processing of the signals from the detector may be arranged to take into account variations in the orientation and/or position of the tagging element in relation to the emitter and detector when the reading is taken.

Each tagging element may be in the form of a substantially rigid plaque or a flexible panel.

The radiation is preferably in the form of X-rays, although other suitable forms of radiation may also be employed.

The portions of each tagging elements which permit the passage of the radiation may comprise apertures in the element, the number and arrangement of said apertures constituting the coded information. The apertures may be circular.

Alternatively, each tagging element may comprise a base formed from a material which permits the passage therethrough of the aforesaid radiation, portions of the base having applied thereto material which is opaque to the radiation, the arrangement of said portions constituting the coded material.

For example, there may be applied to the base a single layer of said material, there being spaced apertures in the layer, the number and arrangement of the apertures constituting the coded information. Alternatively, there may be applied to the base a plurality of spaced portions of said material, the number and arrangement of the portions constituting the coded information. The material which is opaque to radiation may comprise a metallised printing ink.

Each tagging element may be substantially rectangular and attached to its associated article by an adhesive.

The radiation detector may be arranged to produce an image of each tagging element which is scanned by a television camera the output of which is processed by a computer to store, display and/or process the coded information on the element.

The radiation detector may comprise a fluorescent screen on which an image of each tagging element is formed. Alternatively, where the radiation is in the form of X-rays the radiation detector may comprise an X-ray image converter.

The articles may be transported between the emitter and the detector by being spaced apart along a conveyor which is movable past the emitter and detector.

The conveyor may be intermittently movable so that each article remains stationary between the emitter and detector for a predetermined period during which the output from the detector is read. Alternatively, the conveyor may be continuously movable, means being provided for temporarily restraining an article from moving with the conveyor for a predetermined period during which period the output from the detector is read. In a further alternative, the emitter and detector are moved in synchronism with the conveyor for a predetermined period so that an article remains between the emitter and detector for said predetermined period while the output from the detector is being read.

There may be provided a plurality of spaced detectors and/or emitters so disposed that at least one detector can detect the coded information from a tagging element irrespective of variations, within a predetermined range, in the orientation of the element between the emitter and detectors. Alternatively, the detector and/or the emitter may be moved through a plurality of positions when a tagging element is disposed between the detector and emitter, so that the detector can detect the coded information from a tagging element irrespective of variations, within a predetermined range, in the orientation of the element between the emitter and detectors. In a further alternative arrangement, the orientation of each tagging element is varied through a predetermined range when it is disposed between the detector and emitter so that the detector can detect the coded information from the element in at least one orientation thereof.

The invention includes within its scope a tagging element, when used in any of the methods referred to above, and bearing coded information in the form of portions of the element which permit the passage therethrough of a form of radiation to which the rest of the element is opaque.

The invention also provides apparatus for carrying out the method, comprising a radiation emitter, a radiation detector, conveyor means for transporting articles between the emitter and detector, and means for electronically processing signals from the detector to produce an output corresponding to the coded information on the tagging elements fitted to the articles.

BRIEF DESCRIPTION OF THE DRAWINGS

The following is a more detailed description of various embodiments of the invention, reference being made to the accompanying drawings in which.

DETAILED DESCRIPTION OF PREFERRED EMBODIMENTS

Figure 5:
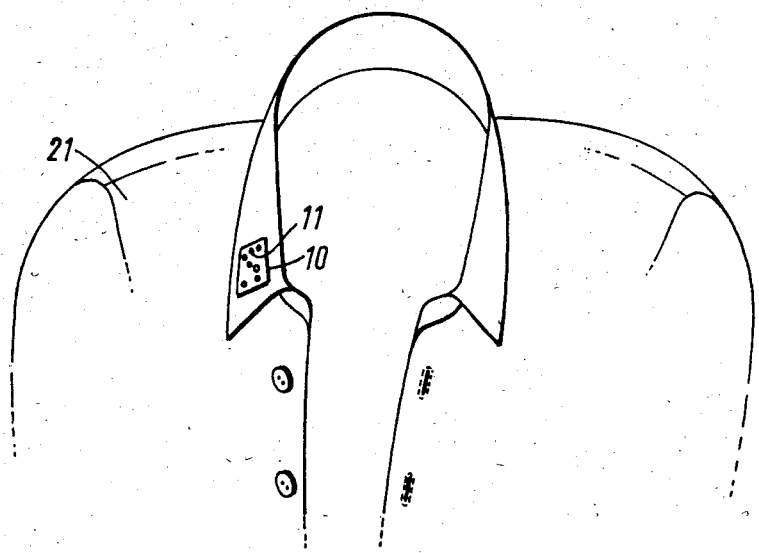
FIG. 5 shows a possible location for a tagging element in a garment.

Referring first to FIG. 5, each tagging element is in the form of a rigid plaque 10 which is generally rectangular in configuration and is formed from strong material such as stainless steel. The plaque may, for example, be approximately 2 centimeters wide and 0.1 millimeters in thickness, although other dimensions of plaque may be used according to their required location.

Each plaque is formed with a plurality of circular apertures 11, the number and arrangement of the apertures on the plaque constituting the required coded information, for example concerning the nature of the garment, the name of the customer to whom the garment is rented and/or the name or reference number of the worker to whom the garment has been allotted. The plaque may be secured, for example by riveting or stitching, to any convenient location on the garment. As shown in FIG. 5 the plaque may be applied to the collar of a shirt, the plaque being interleaved between two layers of fabric forming the collar so as to be invisible when the garment is being worn.

Instead of being formed of substantially rigid material, each tagging element may, alternatively, be formed from flexible material, such as a flexible plastics material. Instead of the coded information being in the form of apertures in the element, the element may comprise a base panel to which is applied one or more metallised areas. Thus, the metallised area may comprise a single layer of metallised material applied to the base panel and formed with apertures, the number and location of which provide the coded information. Alternatively, the coded information may be provided by a number of spaced metallised areas, such as circular spots, applied to the base panel.

The metallised layer or areas may conveniently be applied to the base panel in the form of a metallised printing ink. The base panel may be in the form of a flexible label of fabric or plastics which may be sewn to the garment or secured to it by an adhesive.

Although the tagging elements may be of any of the kinds referred to they will hereinafter, for convenience, be referred to as "plaques".

Figure 1:
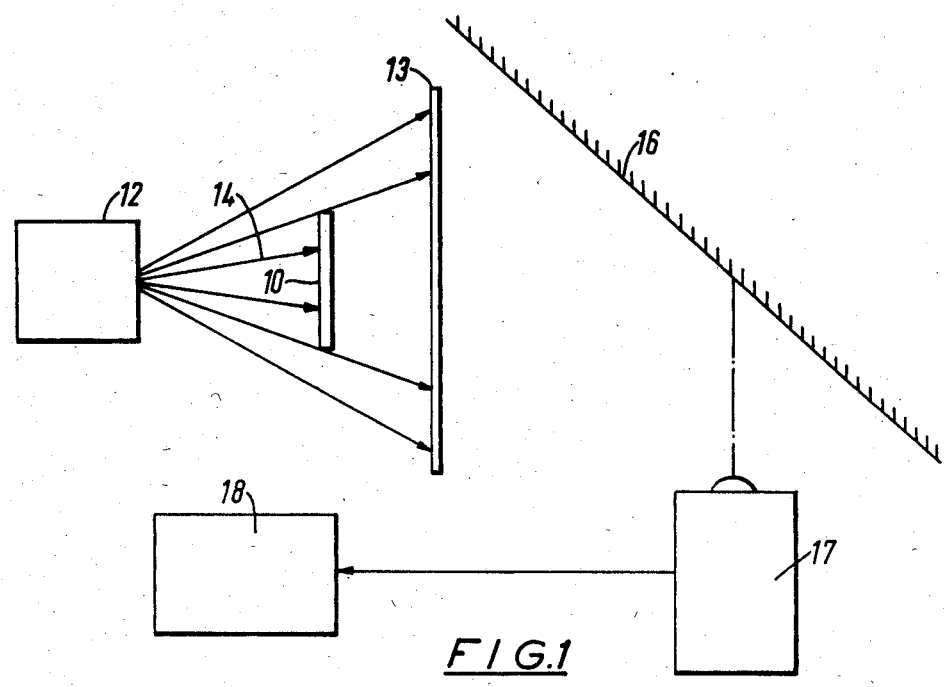
FIG. 1 is a diagrammatic representation of one form of tagging element reading apparatus for carrying out the method according to the invention.
Figure 2:
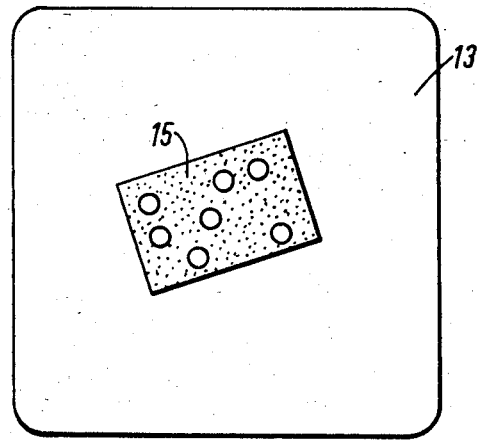
FIG. 2 shows the image of a tagging element on the fluorescent screen of the apparatus of FIG. 1.

In order to read the coded information on the plaques of a number of garments, the garments may be passed in succession through a reading apparatus of the kind shown in FIG. 1. The apparatus comprises a radiation emitter 12, such as an X-ray emitter or radioactive isotope, opposite which is located a radiation detector 13 which includes a fluorescent screen 13. When a plaque 10 passes between the emitter 12 and the screen 13 the radiation cone 14 forms an image 15 of the plaque on the screen 13, as shown in FIG. 2.

The radiation detector also includes a mirror 16 which is arranged at 45° to the screen 13 and reflects light from the screen 13 into a television camera 17, the purpose of the mirror being to prevent the camera being damaged by direct exposure to the radiation. The television camera is coupled to a computer 18.

Figure 3:
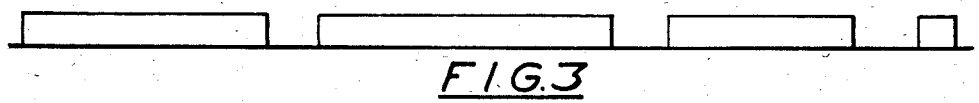
FIG. 3 is a representation of the signal representing a single scanning line of the image on the fluorescent screen.

The television camera 17 scans the image 15 on the fluorescent screen and produces for each scan line a voltage output of the form shown in FIG. 3, the dark portions of the image (corresponding to the material of the plaque, or a metallised area thereof) giving a high voltage, and the light portions of the image (corresponding to the apertures 11, or non-metallised areas) giving a low voltage. These scanning signals are converted, in known manner, into digital signals which are passed to a computer 18 for storage and processing.

Since the plaques passing between the emitter 12 and detector 13 may be disposed in various attitudes in relation thereto, the size and orientation of the image 15 on the screen 13 may vary. Consequently the computer 18 is programmed to compare the actual image received from the television camera with a so-called "ideal image". Thus the information corresponding to the image 15 on the screen 13 is examined to determine the orientation of the actual image in relation to the ideal image, and the actual image is then rotated until its position conforms to that of the ideal image.

The size of the actual image is then compared to the ideal image and the actual image increased or decreased in size to match that of the ideal image.

When the actual image has been regularised in this manner, the computer checks whether the coding perforations in the actual image conform to the coding perforations in the ideal image. In the case where the coding perforations are found to correspond, then the coding is determined according to the programme. This process can be repeated several times on the occurrence of differences between the ideal image and actual image so as to avoid any possible error in decoding.

The coded information in the computer memory, derived from the plaques, may then be further processed, displayed and/or recorded according to the user's requirements.

Figure 4:
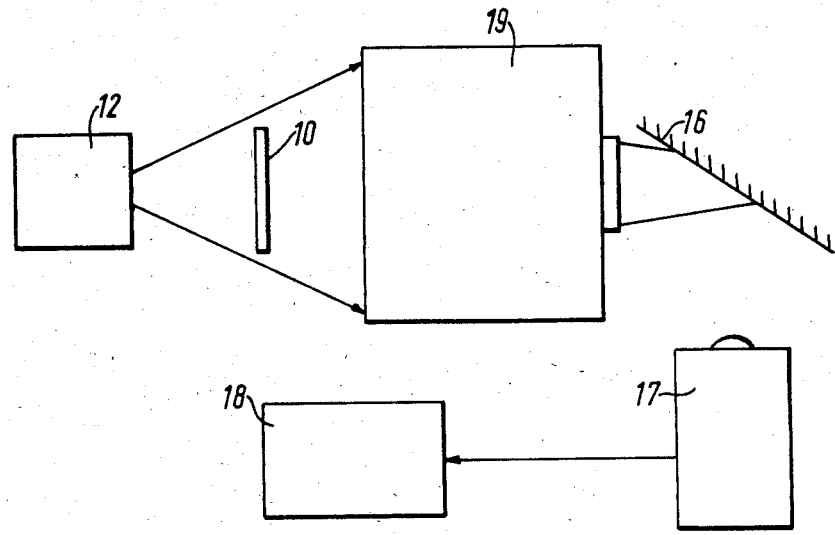
FIG. 4 is a similar view to FIG. 1 of an alternative form of apparatus.

In the alternative arrangement shown in FIG. 4 the fluorescent screen 13 of the FIG. 1 arrangement is replaced by an X-ray image converter 19 which, in principle, also consists of a fluorescent screen on which the beam corresponding to the shadow image of the plaque produces an image of free electrons, which image is then reproduced in intensified form on a further fluorescent screen as a visible image which is deflected by the mirror 16 and processed by the television camera 17 and computer 18 as in the arrangement of FIG. 1.

In a further alternative, not shown, the detector may be in the form of an array of diodes sensitive to the radiation employed. In this case the radiation image is projected onto the diode array, and the output of the array is fed directly to the computer for processing.

Figure 6:
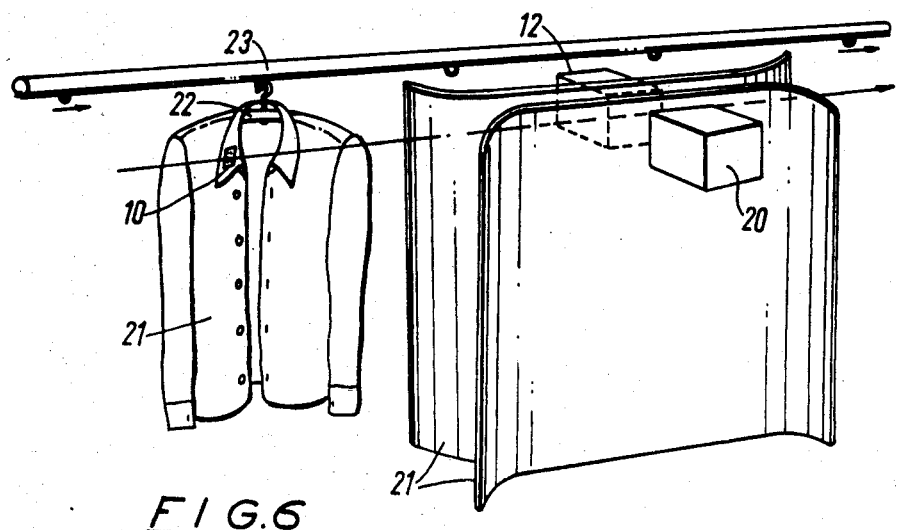
FIG. 6 is a diagrammatic representation of one form of conveyor system for passing garments successively through the apparatus.
Figure 7:
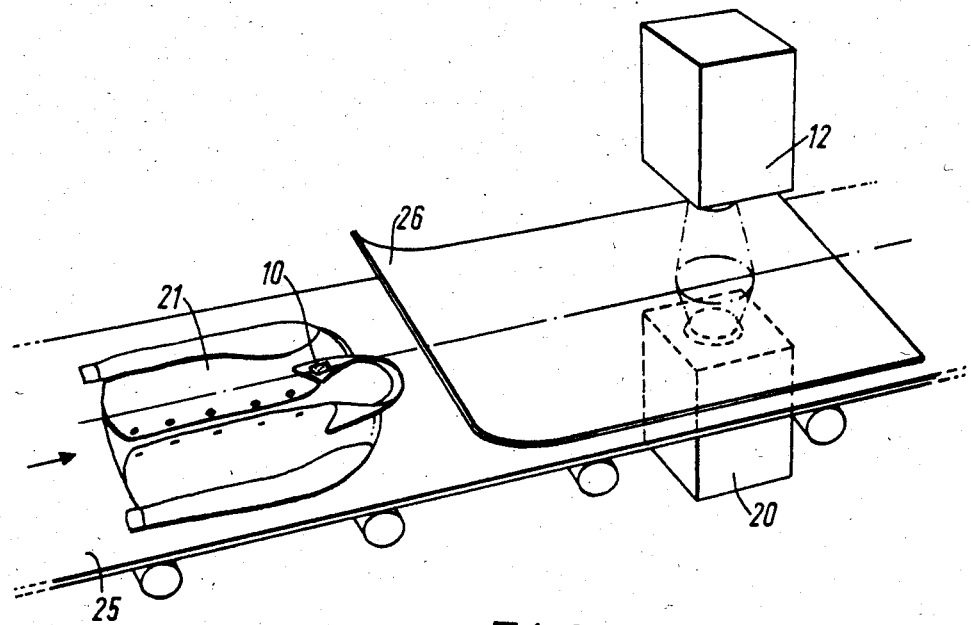
FIG. 7 is a similar view of an alternative form of conveyor system.

FIGS. 6 and 7 show alternative conveyor arrangements for transporting garments successively between the emitter 12 and the detector (indicated diagrammatically at 20 in FIGS. 6 and 7).

In the arrangement of FIG. 6, each garment 21 is suspended by a hanger 22 from a conveyor 23. Between the emitter 12 and detector 20 there are disposed spaced guide plates 24 providing divergent entry and exit openings. The guide plates serve to orientate each garment at right angles to the radiation beam as the garments are transported between the plates 24 by the conveyor. This orientation of the garment also disposes the plaque 10 approximately at right angles to the radiation beam.

In the alternative arrangement shown in FIG. 7, the garments are transported on a horizontal belt conveyor 25, a guide plate 26 having an upwardly curved entry portion being disposed over the conveyor between the emitter 12 and detector 20 so as to ensure that the garment lies substantially flat between the emitter and detector.

It will be appreciated that other arrangements may be used for orientating the garments with respect to the emitter and detector, depending on the nature of the garment.

Where a single radiation emitter and detector are provided, the coded information may be read with the plane of the plaque tilted at an angle of up to about 10° from the ideal position where it lies at right angles to the direction of the radiation. At greater angles of tilt, however, the reading of the coded information may not be reliable. There are three methods by which such reliability can be increased.

In one embodiment a plurality of detectors, or emitter/detector assemblies, are provided which are angularly spaced so that at least one detector or assembly will be correctly located to read the plaque, regardless of its orientation. Alternatively, the detector or emitter/detector assembly may be arranged to oscillate or otherwise move through various positions while reading a plaque so that it will be able to read the plaque in at least one position, regardless of the orientation of the plaque.

In a further alternative the means supporting the garment may be arranged to oscillate the garment as it passes through the emitter/detector assembly, so that during such oscillation the plaque will pass through at least one orientation where it can be read by the assembly.

The above-mentioned arrangements may be used separately or in combination.

In order to protect operators from the radiation from the emitter, radiation shields (not shown) are provided around the portion of the conveyor which passes between the emitter and detector. Since the radiation travels in straight lines the conveyor may be arranged to travel in a tortuous path at each end of the stretch of the conveyor travelling past the emitter, the shields being shaped to follow the path of the conveyor and thus prevent the escape of radiation beyond the limits of the shields. The straight stretch of the conveyor between the emitter and detector should be of sufficient length to accommodate the longest garment to be handled by the apparatus.

Preferably an arrangement is provided for interrupting relative movement between the plaque and the emitter and detector while the plaque is being read. For example, the conveyor may be intermittently driven so that each garment remains stationary between the emitter and detector for a predetermined period. Alternatively the emitter and detector system may be movable with the conveyor for a predetermined period when the garment is disposed between them. For example, the emitter and detector may be mounted on swinging arms.

In an alternative arrangement, a stop device is provided which is periodically located across the conveyor so as to engage a garment on the conveyor and restrain the garment from movement with the conveyor, the conveyor continuing to slip past the garment and the stop device while the plaque is read.

In either of the above arrangements the conveyor may conveniently run at a linear speed of approximately 1 meter per second, and the size of the cubicle protected from radiation may be approximately 2 meters by 3 meters, the total length of the conveyor belt being approximately 5 meters. In order that the plaque passes within the lateral range of the radiation beam it will normally require to be placed within a "reading strip" approximately 10 centimeters wide as it is transported by the conveyor.

Although the invention has been described in relation to the coded tagging of garments, and particularly garments for supply under a linen hire system of the kind first referred to, it will be appreciated that the method and apparatus is also applicable to the coded tagging of many other types of article.

I claim:

1. A method for the coded tagging of articles, such as garments, comprising securing to each of a plurality of optically opaque articles a tagging element bearing coded information in the form of portions of the element which permit the passage therethrough of a form of radiation which also passes through the optically opaque material of the articles but to which the rest of the element is opaque, conveying at least the portions of the articles bearing the tagging elements in succession between an emitter and a detector of said form of radiation, said detector producing an image of each tagging element which is scanned by a television camera the output of which is processed by a computer to store, display and/or process the coded information on the element.

2. A method according to claim 1, wherein each tagging element is in the form of a substantially rigid plaque.

3. A method according to claim 1, wherein each tagging element is in the form of a flexible panel.

4. A method according to claim 1, wherein the radiation is in the form of X-rays.

5. A method according to claim 1, wherein the portions of each tagging element which permit the passage of the radiation comprise apertures in the element, the number and arrangement of said apertures constituting the coded information.

6. A method according to claim 5, wherein the apertures are circular.

7. A method according to claim 1, wherein each tagging element comprises a base formed from a material which permits the passage therethrough of the aforesaid radiation, portions of the base having applied thereto material which is opaque to the radiation, the arrangement of said portions constituting the coded material.

8. A method according to claim 7, wherein there is applied to the base a single layer of said material, there being spaced apertures in the layer, the number and arrangement of the apertures constituting the coded information.

9. A method according to claim 7, wherein there are applied to the base a plurality of spaced portions of said material, the number and arrangement of the portions constituting the coded information.

10. A method according to claim 7, wherein the material which is opaque to radiation comprises a metallised printing ink.

11. A method according to claim 1, wherein each tagging element is substantially rectangular.

12. A method according to claim 1, wherein each tagging element is attached to its associated article by an adhesive.

13. A method according to claim 1, wherein the radiation detector comprises a fluorescent screen on which an image of each tagging element is formed.

14. A method according to claim 1, wherein the radiation is in the form of X-rays and the radiation detector comprises an X-ray image converter.

15. A method according to claim 1, wherein the articles are transported between the emitter and the detector by being spaced apart along a conveyor which is movable past the emitter and detector.

16. A method according to claim 15, wherein the conveyor is intermittently movable so that each article remains stationary between the emitter and detector for a predetermined period during which the output from the detector is read.

17. A method according to claim 15, wherein the conveyor is continuously movable, means being provided for temporarily restraining an article from moving with the conveyor for a predetermined period during which period the output from the detector is read.

18. A method according to claim 15, wherein the emitter and detector are moved in synchronism with the conveyor for a predetermined period so that an article remains between the emitter and detector for said predetermined period while the output from the detector is being read.

19. A method according to claim 15, wherein there is provided a plurality of spaced detectors and/or emitters so disposed that at least one detector can detect the coded information from a tagging element irrespective of variations, within a predetermined range, in the orientation of the element between the emitter and detectors.

20. A method according to claim 15, wherein the detector and/or the emitter is moved through a plurality of positions when a tagging element is disposed between the detector and emitter, so that the detector can detect the coded information from a tagging element irrespective of variations, within a predetermined range, in the orientation of the element between the emitter and detectors.

21. A method according to claim 15, wherein the orientation of each tagging element is varied through a predetermined range when it is disposed between the detector and emitter so that the detector can detect the coded information from the element in at least one orientation thereof.

22. Apparatus for reading coded information on tagging elements attached to optically opaque articles, such as garments, comprising a radiation emitter which emits a form of radiation which passes through the optically opaque material of the articles and through portions of the tagging elements, other portions of the tagging elements being opaque to the radiation and the arrangement of the portions of the tagging elements providing the coded information, a radiation detector which produces an image of each tagging element, a television camera which scans said image and produces output signals corresponding to the coded information on the tagging elements, conveyor means for transporting articles between the radiation emitter and detector, and a computer which receives said output signals from the television camera and processes said signals to store and process the coded information on the tagging elements.

* * * * *